US008948203B1

United States Patent
Nolan et al.

(10) Patent No.: US 8,948,203 B1
(45) Date of Patent: Feb. 3, 2015

(54) METHOD AND SYSTEM FOR USING ASYMETRIC TRANSFER RATES IN RECEIVE AND TRANSMIT PATHS OF A NETWORK

(71) Applicant: QLOGIC, Corporation, Aliso Viejo, CA (US)

(72) Inventors: John Nolan, Sacramento, CA (US); Gary Rogan, Los Altos, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 74 days.

(21) Appl. No.: 13/755,770

(22) Filed: Jan. 31, 2013

(51) Int. Cl.
*H04J 3/22* (2006.01)
*H04L 12/24* (2006.01)

(52) U.S. Cl.
CPC ................................. *H04L 41/0896* (2013.01)
USPC .......................................... 370/468; 370/400

(58) Field of Classification Search
CPC ............................... H04L 49/90; H04L 47/70
USPC ............. 370/230, 230.1, 232–235, 335–336, 370/342–343, 345, 391, 395.41, 395.43, 370/441–442, 465, 468
See application file for complete search history.

(56) References Cited

U.S. PATENT DOCUMENTS

| | | | | |
|---|---|---|---|---|
| 8,391,300 | B1* | 3/2013 | Dropps et al. | 370/401 |
| 8,437,283 | B2* | 5/2013 | Pabst | 370/285 |
| 2006/0143344 | A1* | 6/2006 | Lindsay et al. | 710/105 |
| 2008/0317069 | A1* | 12/2008 | Huang et al. | 370/503 |
| 2009/0154365 | A1* | 6/2009 | Diab et al. | 370/248 |
| 2009/0232151 | A1* | 9/2009 | Furlong et al. | 370/419 |
| 2009/0279558 | A1* | 11/2009 | Davis et al. | 370/412 |
| 2011/0317716 | A1* | 12/2011 | Chalupsky et al. | 370/465 |
| 2014/0072304 | A1* | 3/2014 | Boyd et al. | 398/67 |
| 2014/0105014 | A1* | 4/2014 | Conway et al. | 370/230 |
| 2014/0119381 | A1* | 5/2014 | Diab et al. | 370/431 |

\* cited by examiner

*Primary Examiner* — Kevin Mew
(74) *Attorney, Agent, or Firm* — Klein, O'Neill & Singh, LLP (57) ABSTRACT

Method and system for establishing asymmetric transfer rates between a first node and a second node communicating with each other via a network link using Ethernet as a network protocol is provided. The method includes determining during a negotiation process that the first node and the second node have compatible asymmetric capability to set a first rate for transmitting information via the network link and a second rate for receiving information via the network link using Ethernet as the network protocol; and establishing the first rate for transmitting information and the second rate for receiving information. Furthermore, the first node includes a first port having a receive segment and a transmit segment. The transmit segment and the receive segment have separate PLL modules such that the transmit segment can transmit data at a first rate and the receive segment can receive data at a second rate via the network link.

13 Claims, 4 Drawing Sheets

METHOD AND SYSTEM FOR USING ASYMETRIC TRANSFER RATES IN RECEIVE AND TRANSMIT PATHS OF A NETWORK

TECHNICAL FIELD

The present invention relates to networks.

BACKGROUND

A computer network, often referred to simply as a network, is a group of interconnected computing devices that facilitates communication among users and allows users to share resources. Adapters, switches and routers may be used to interconnect network devices. Such devices may be referred to simply as network nodes.

In conventional systems, a first network node may communicate with a second network node to transmit and receive data. The nodes typically negotiate a transfer rate for transmitting and receiving data. The negotiation rate picks the highest transfer rate that may be available between network nodes and then data can be transmitted and received at the negotiated rate.

Simply using the highest rate may not be desirable in a networking environment because a network link may be underutilized in one direction and computing applications may have asymmetric data patterns such as access to read only storage device at a storage area network, a web server or any other device. Continuous efforts are being made to improve network communication.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for establishing asymmetric transfer rates between a first node and a second node communicating with each other via a network link using Ethernet as a network protocol is provided. The method includes determining during a negotiation process that the first node and the second node have compatible asymmetric capability to set a first rate for transmitting information via the network link and a second rate for receiving information via the network link using Ethernet as the network protocol; and establishing the first rate for transmitting information and the second rate for receiving information.

In yet another embodiment, a machine implemented method for establishing asymmetric transfer rates between a first node and a second node communicating with each other via a network link using the Ethernet protocol is provided. The method includes exchanging a first set of parameters between the first node and the second node with an indicator that the first node and the second node will be sending a second set of parameters, during a negotiation process; exchanging a second set of parameters between the first node and the second node that indicate transfer rates for transmitting information and transfer rates for receiving information at the first node and the second node; determining during the negotiation process that the first node and the second node have compatible asymmetric capability to set a first rate for transmitting information via the network link using Ethernet as the network protocol and a second rate for receiving information via the network link; and establishing the first rate for transmitting information and the second rate for receiving information.

In yet another embodiment a system having a first node communicating with a second node via a network link using Ethernet as a network protocol is provided. The first node includes a first port comprising: a transmit segment serializer/de-serializer (SERDES), a transmit segment physical coding (PCS) module, a transmit segment media access control (MAC) module; and a separate receive segment serializer/de-serializer (SERDES), a receive segment physical coding (PCS) module, a receive segment media access control (MAC) module. The transmit segment and the receive segment have separate phased locked loop (PLL) modules such that the transmit segment can transmit data at a first rate and the receive segment can receive data at a second rate via the network link.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Figure 1A:
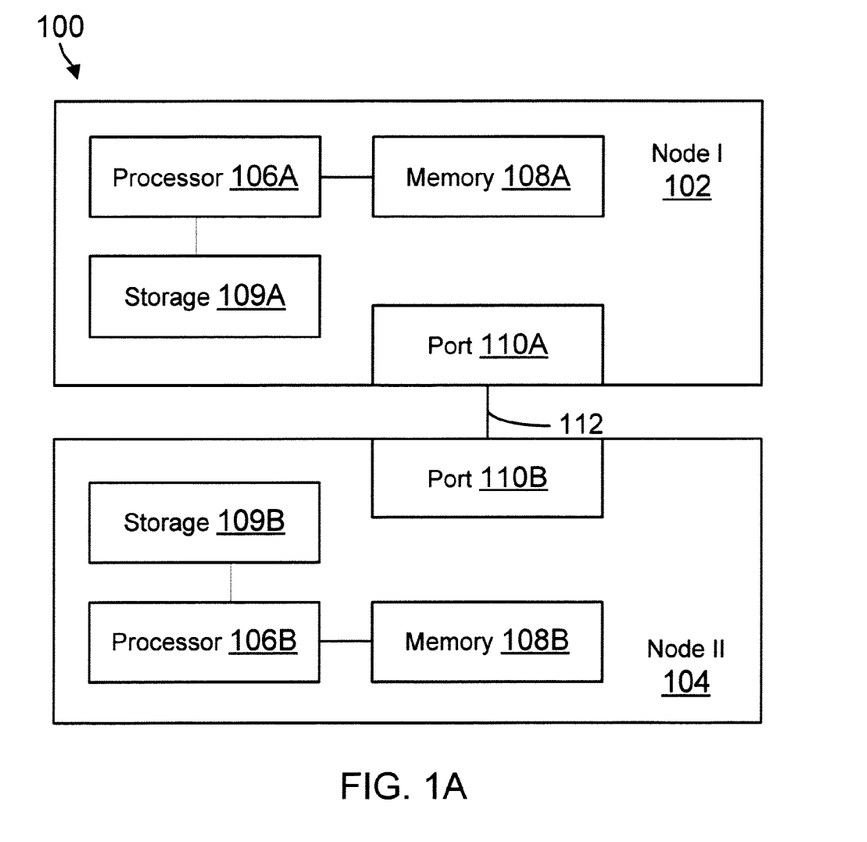
FIG. 1A is a system diagram showing components using the embodiments of the present disclosure.

FIG. 1A is a block diagram of a system 100 configured for use with the present embodiments. The system 100 may include one or more nodes, 102 (shown as Node I) and 104 (shown as Node II) that communicate with each other via a link 112. Nodes 102/104 may be referred to as network devices and/or computing devices. Nodes 102/104 may include a network adapter, host bus adapter, converged network adapter, network switch elements or other device types.

Each node 102/104 may include one or more processors (106A/106B) coupled to a memory (108A/108B) via a computer bus (or interconnect) (not shown). The processors 106A/10B execute computer-executable process steps out of memory 108A/108B. Processors 106A/106B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus that connects the processors to the memory may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 108A/108B provides the processors 106A/106B with access to memory storage. Memory 108A/108B may include random access main memory (RAM). When executing stored computer-executable process steps from a storage device, the processors 106A/106B may store and execute the process steps out of RAM. Read only memory (ROM, not shown) may also be used to store invariant instruction sequences, such as start-up instruction sequences or basic input/output system (BIOS) sequences for operation of a keyboard (not shown).

Nodes 102/104 may further include a local storage device 109A/109B, respectively. The storage devices may be for example a hard disk, a CD-ROM, a non-volatile memory device (flash) or any other device. Storage devices 109A/109B may store firmware instructions, operating system program files, application program files, and other files.

Nodes 102/104 also include ports 110A/110B that may be configured to handle network traffic via link 112. Ports 110A/110B include logic and circuitry to transmit and receive information using link 112. Most ports have receive logic to receive information and transmit logic to transmit information. Typically, a network protocol or standard is used by nodes 102/104 to communicate with each other.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that may approximate 100 Gigabits per second (Gb/s). The descriptions of the various embodiments described herein are based on using Ethernet (which includes 100 Base-T and/or Gigabit Ethernet) as the network protocol.

In conventional systems, Node 102 and Node 104 typically negotiate a transfer rate for sending and receiving information. When Ethernet is used as a standard, then the negotiation process is referred to as "Auto-Negotiation" that is described in more detail below. The transfer rate is typically symmetric, which means that data is received and transmitted by the nodes at the same rate.

Having a same symmetric rate for transmitting and receiving data can have some shortcomings. For example, power dissipation may be higher than necessary when one side (receive or transmit side) operates at a rate higher than what may be needed to transmit its portion of the data. The overall complexity and cost of operating the links may also be higher than necessary for the same reasons above.

As an example, a 40 Gb/s link will typically use four lanes each operating at 10Gb/s for receiving and transmitting data. If the links are utilized less than 25% in a single direction, three of the lanes may not be needed but will still consume additional power and resources. In one embodiment, as described below in detail, in cases where network traffic patterns can be predicted, lanes can be removed from an application integrated circuit (ASIC) chip, thus reducing gate count, power, and pin count. Moreover, reducing the number of lanes makes routing easier for system designers with dense port layouts.

Figure 1B:
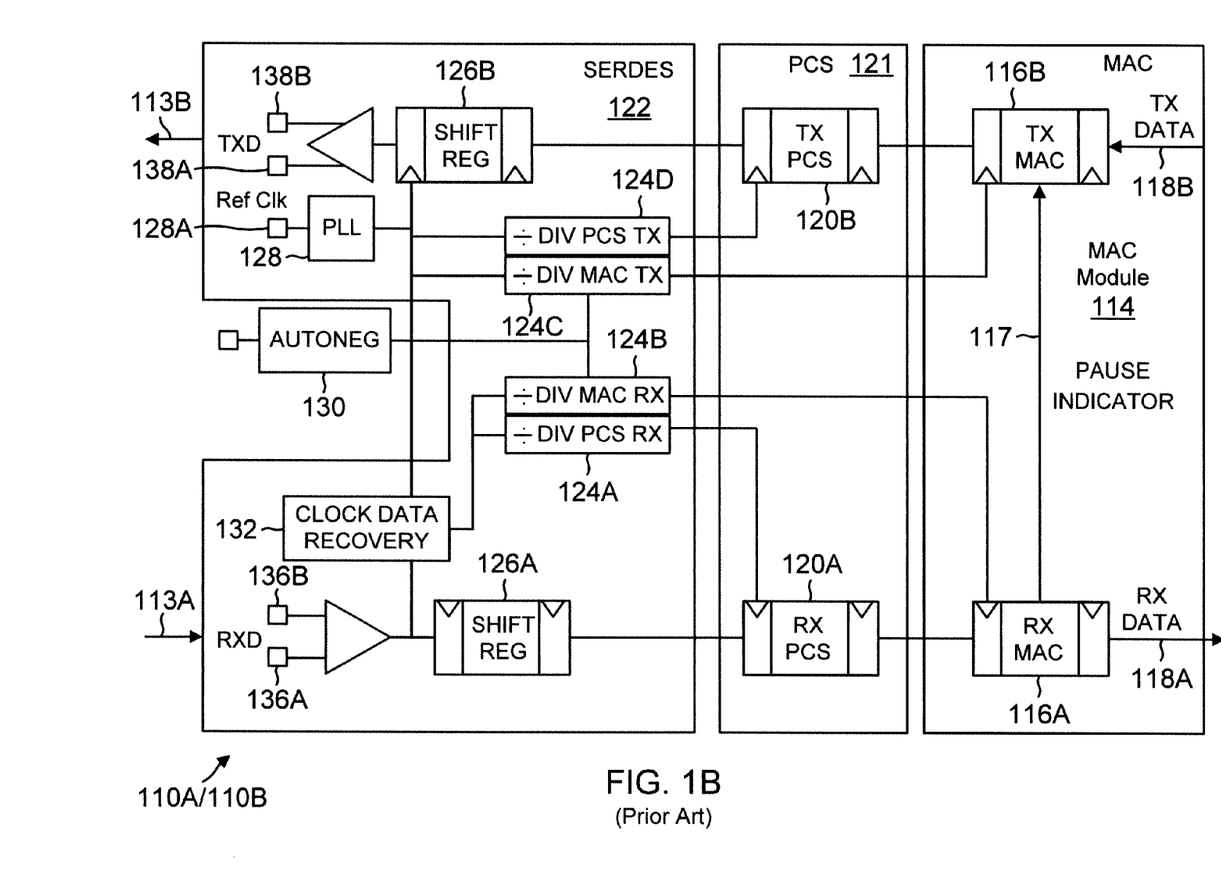
FIG. 1B shows a structure used by conventional systems.

FIG. 1B shows an example of conventional ports 110A (or 110B) that uses a symmetric transfer rate. The description below is based on port 110A, but is equally applicable to port 110B.

Port 110A include a SERDES (serial-deserializer) 122, PCS (Physical Coding Sub-Layer) 121 and a Media Access Control (MAC) module 114. Ports 110A may include other components and modules, details of which are not germane to the present disclosure.

SERDES 122 is provided to convert a serial data stream into a parallel data stream and vice-versa. PCS 121 is used to define the physical layer specifications for network protocols. PCS 121 performs encoding, for example, 8b/10b encoding and includes an auto-negotiation block 130 that is described below in more detail. MAC 114 provides addressing and channel access control mechanisms that make it possible for several terminals or network nodes to communicate within a multiple access network that incorporates a shared medium, e.g. Ethernet. The hardware that implements MAC 114 is referred to as a media access controller.

Port 110A receives incoming information (parameters, messages and/or payload, may jointly be referred to as "data") 113A at SERDES 122. A clock data recovery module 132 is used to recover a clock from incoming data 113B. The recovered clock may be manipulated by divisor 124A and 124B. The output from divisor 124A is the clock used by PCS 121, while the output from divisor 124B may be the reference clock for MAC 114, described below in detail. The receive data at the SERDES 122 is shown as 136A-136B. Data is moved via gate 134 into a shift register 126A. From there data is processed at Rx PCS module 120A and the by Rx MAC module 116A. The processed data 118A is then sent to another processing module (not shown).

On the transmit side, data 118B is received by Tx MAC module 116B and then forwarded to Tx PCS module 120B. The data is processed and provided to the shift register 126B. A PLL 128 provides an input clock for outgoing data 138A/138B. PLL 128 output is based on a reference clock 128A. The output from PLL 128 depends on the rate at which data 113B is transmitted via link 112.

When the receive side receives a frame to pause transmission, logic 116A sends an indicator 117 to logic 116B to pause frame transmission. Transmission may have to be paused for congestion control or any other reason.

In conventional systems, when ports 110A/110B start communication, they perform an Auto-Negotiation process using block 130. During this process, the ports exchange various parameters, including what transfer rate the ports can support. The highest rate that can be supported by the links and by both the ports is selected. Typically, the format for Auto-Negotiation is provided by the network protocol, for example, Ethernet.

As mentioned above, the ports use the same transfer rate for sending and receiving data. This may not be desirable in certain environments. The embodiment shown in FIG. 1C overcomes this limitation, as described below in detail.

Figure 1C:
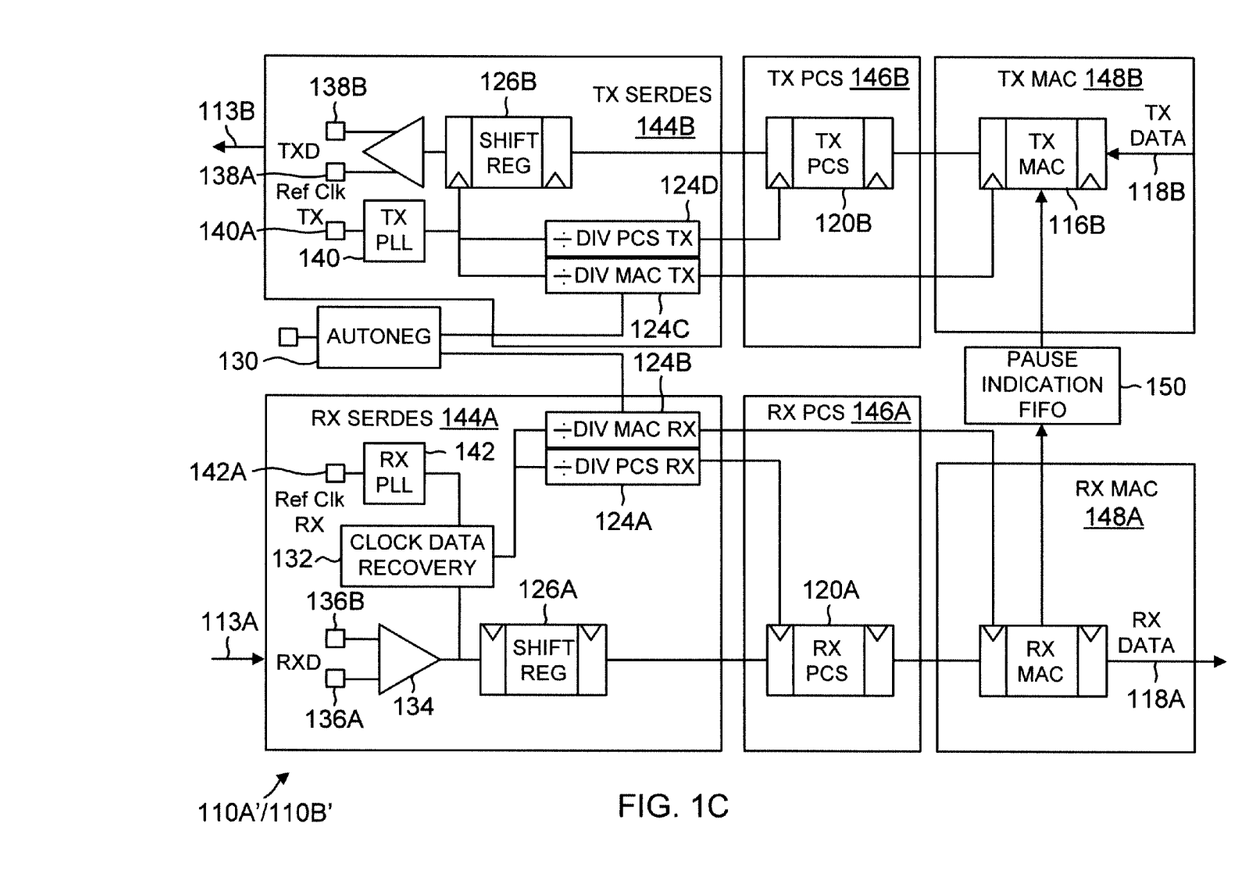
FIG. 1C shows an embodiment of the present disclosure for supporting asymmetric rates in a network.

FIG. 1C shows ports 110A'/110B' that can be used by nodes 102 and 104 respectively. In ports 110A'/110B' the SERDES, PCS and MAC are separate modules. For example, the receive side has Rx SERDES 144A, Rx PCS module 146A and Rx MAC module 148A. The transmit side has Tx SERDES 144B, Tx PCS module 146B and Tx MAC module 148B.

The Rx SERDES 144A includes an independent PLL 142 that receives a reference clock 142A. The Tx SERDES 144B may also include a separate Tx PLL 140 that receives a reference clock 140A. Having separate PLLs and reference clocks, the ports can negotiate different transfer rates for transmitting and receiving data.

Each port 110A'/110B' also include a pause indication first-in-first out (FIFO) module 150. The FIFO module 150 is used to store any pause frames that have been received from a receiving port. This notifies the transmitting port to pause frame transmission.

The Auto-Negotiation block 130 is shared between the receive and transmit side. The Auto-Negotiation process however is modified so that asymmetric transfer rates can be set for receiving and transmitting data. The auto-negotiation process is described below with respect to FIG. 2.

Figure 2:
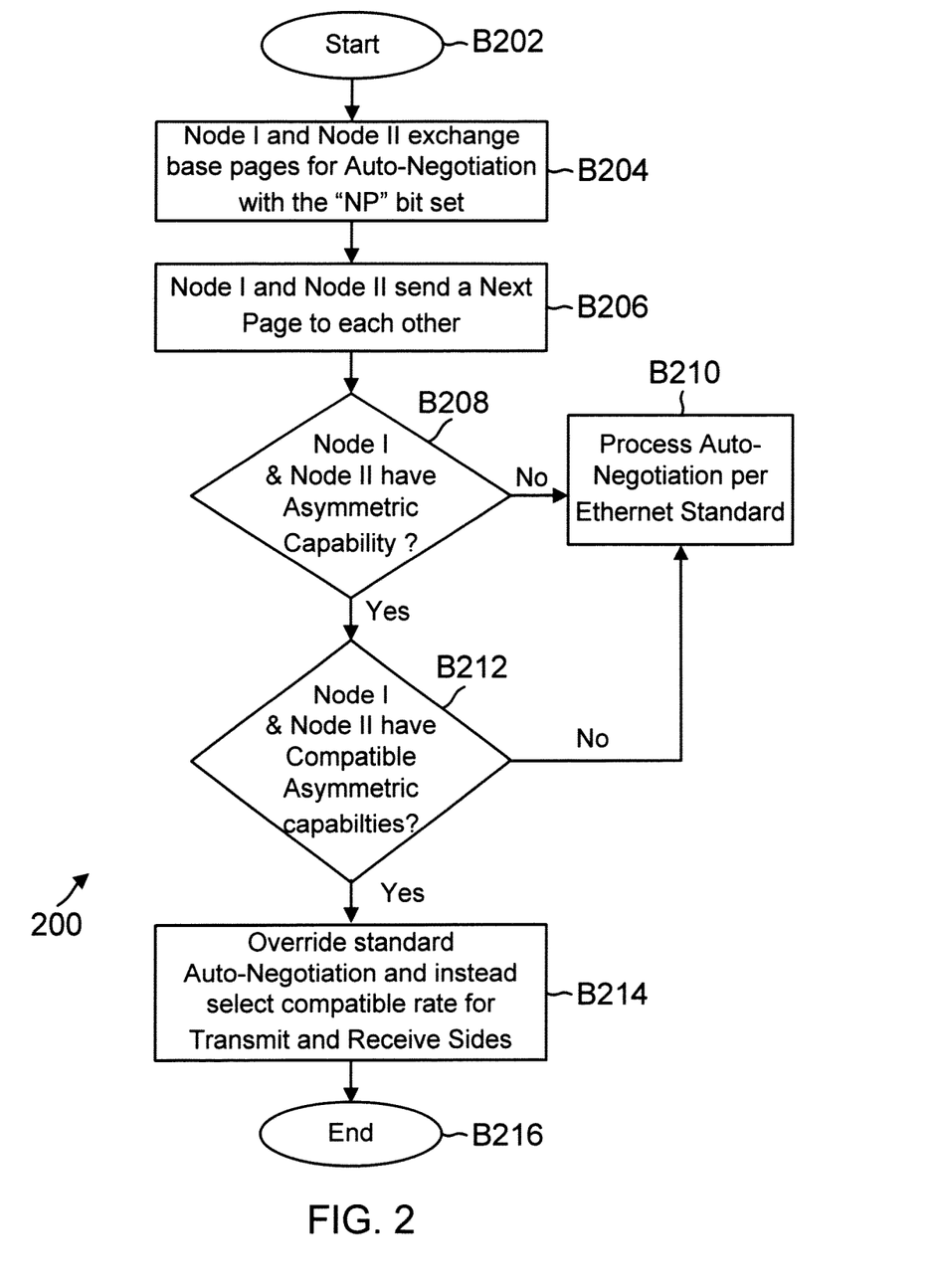
FIG. 2 shows a process flow for auto-negotiation between network ports.

FIG. 2 shows a negotiation process 200 executed by two communicating ports of network nodes, according to one embodiment. The process begins in block B202, when the network nodes 102 and 104 are initialized or reset. In one embodiment, Auto-Negotiation is used when Ethernet-related protocol is used for communication. The process below is described using Ethernet and Auto-Negotiation, but is not limited to Ethernet or any other protocol.

In block B204, Node 102 and Node 104 exchange base pages for Auto-negotiation. Auto-negotiation under the Ethernet standard is described in IEEE 802.3 Specification, Clauses 28, 37, and 73. Each clause may have a slightly different implementation, but in general the clauses enable two communicating ports to advertise capabilities that the ports support. Auto-negotiation is conducted by using "base pages" and optional "next pages". The following shows examples of three base pages, Base Page 1, Base Page 2 and Base Page 3. The various fields in each base page are described below.

| Base Page 1: | | | | | | | | | | | | | | | |
| --- | --- | --- | --- | --- | --- | --- | --- | --- | --- | --- | --- | --- | --- | --- | --- |
| D0 | D1 | D2 | D3 | D4 | D5 | D6 | D7 | D8 | D9 | D10 | D11 | D12 | D13 | D14 | D15 |
| S0 | S1 | S2 | S3 | S4 | E0 | E1 | E2 | E3 | E4 | C0 | C1 | C2 | RF | ACK | NP |

Base Page 1 includes bits D0-D15. Bits D01-D4 have values S0-S3 that provide a technology Selector Field, for example, Ethernet. Bits D5-D9 include Echoed Nonce field E0-E4. Bits D10-D12 are used to indicate "Pause" capability based on which one port can be instructed to pause transmission. Bit D13 is used to indicate if there is remote fault (RF) at a remote node. Bit D14 is used to acknowledge a message (ACK). Bit D15 is used to indicate that a next page (NP) is going to follow a current page.

| Base Page II: | | | | | | | | | | | | | | | |
|---|---|---|---|---|---|---|---|---|---|---|---|---|---|---|---|
| D0 | D1 | D2 | D3 | D4 | D5 | D6 | D7 | D8 | D9 | D10 | D11 | D12 | D13 | D14 | D15 |
| T0 | T1 | T2 | T3 | T4 | A0 | A1 | A2 | A3 | A4 | A5 | A6 | A7 | A8 | A9 | A10 |

| Base Page III: | | | | | | | | | | | | | | | |
|---|---|---|---|---|---|---|---|---|---|---|---|---|---|---|---|
| D0 | D1 | D2 | D3 | D4 | D5 | D6 | D7 | D8 | D9 | D10 | D11 | D12 | D13 | D14 | D15 |
| A11 | A12 | A13 | A14 | A15 | A16 | A17 | A18 | A19 | A20 | A21 | A22 | A23 | A24 | F0 | F1 |

Base Page II and III shown above include bits D0-15, respectively. Bits D0-D4 are used to include transmitted Nonce fields. Bits D5-D15 of Base Page II and bits D0-D13 of Base Page III is a 25-bit wide, Technology Ability field shown as A0-A24, that are described below. Bits D14-D15 of Base Page III are used to provide Forward Error Correction (FEC) code, the details of which are not germane to the present embodiments.

Technology Ability Field bits A0-A24 may be used during Auto-Negotiation to include information indicating technologies that are supported specific to the Selector Field values of Base Page I. A0-A24 may be mapped to individual technologies such that abilities are advertised in parallel for a single selector field value. The Technology Ability Field encoding for the IEEE 802.3 selector with Auto-Negotiation for Backplane Ethernet is described in Table 73-4 of the IEEE 802. Standard that is reproduced below. Multiple technologies may be advertised in the link codeword.

TABLE 73-4 of IEEE 802.3 Standard: Technology Ability Field encoding

| Bit | Technology |
|---|---|
| A0 | 1000BASE-KX |
| A1 | 10GBASE-KX4 |
| A2 | 10GBASE-KR |
| A3 through A24 | Reserved for future technology |

The various technologies of Table 73-4 map to the following speeds, encodings and lane utilizations:
KR-4 (4 lane 40Gb/S 64/66 encoded)
KR (1 lane 10Gb/S 64/66 encoded)
KX-4 (4 lane 10Gb/S 8/10b encoded)
KX (1 lane 1Gb/S 8/10b encoded)

After an exchange of base pages and optional next pages, both ports use the same priority resolution scheme to determine the highest common speed/technology. Both sides then adjust the speed and encoding of the initial lane. The term lane as used herein means a physical means to send and receive a signal/message. For example, a lane could be a pair of coupled copper traces, impedance and length matched to carry a high speed differential signal.

In block B206, Node 102 and Node 104 using ports 110A'/110B' send a Next Page to each other. The Next Page may be used by the ports to indicate that the ports support asymmetric capabilities. The Next Page format and how it may be used to advertise asymmetric capabilities is described below in detail.

In block B208, the process determines if Node 102 and Node 104 have asymmetric capability. This capability may be set during a configuration process, when the nodes are configured to operate. The capability may be set or disabled using a network management application (not shown) executed by a computing device. In one embodiment, the management application may be executed by either Node 102 or Node 104. In another embodiment, the management application may be executed by a management console that is used to manage network resources.

If the Nodes 102/104 don't have asymmetric ability, then the process moves to block B210, when standard or typical Auto-Negotiation is performed.

If the nodes have asymmetric abilities, then in block B212, the process determines if the abilities are compatible.

If the abilities are not compatible, then the process moves to block B210, which is described above.

If the capabilities are compatible, then in block B214, the standard Auto-Negotiation process is overridden and instead separate, e.g. asymmetric transfer rates are selected for the receive and transmit sides. Thereafter, the process ends in block B216.

The following is an example of a Next Page I.

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| M0 | M1 | M2 | M3 | M4 | M5 | M6 | M7 | M8 | M9 | M10 | T | ACK2 | MP | ACK | NP |

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| U0 | U1 | U2 | U3 | U4 | U5 | U6 | U7 | U8 | U9 | U10 | U11 | U12 | U13 | U14 | U15 |

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| U16 | U17 | U18 | U19 | U20 | U21 | U22 | U23 | U24 | U5 | U26 | U27 | U28 | U29 | U30 | U31 |

The first Next Page includes bits D0-D15. Bits D0-D10 may be used for pre-defined messages. In one embodiment, bits M0-M10 may be used by ports 110A'/110B' to indicate that the Next Page is for an asymmetric Next Page. Bit D11 is a toggle bit "T" that is used to track next pages. Bit D13 has a value for Message Page (MP) indicating if the page is formatted or unformatted. Bit D14 includes the ACK bit and bit D15 includes the NP bit indicating if there is another next page. The Next Page 1 also includes bits U0-U31. These bits may be used to indicate parameters for the receive (Rx) side and the transmit (Tx) side. For example, as shown below, bits U0-U15 may be used for Rx side and bits 16-31 may be used for transmit side.

The following is an example of bits values for the Rx side:
U0 KR-4 Rx (4 lane 10Gb/s 64/66 encoded)
U1 KR Rx (1 lane 10Gb/s 64/66 encoded)
U2 KX-4 Rx (4 lane 10Gb/s 8/10b encoded)
U3 KX Rx (1 lane 1Gb/s 8/10b encoded)
U4-U15 Reserved for future use The following is an example of bits values for the Tx side:
U16 KR-4 Tx (4 lane 10Gb/s 64/66 encoded)
U17 KR Tx (1 lane 10Gb/s 64/66 encoded)
U18 KX-4 Tx (4 lane 10Gb/s 8/10b encoded)
U19 KX Tx (1 lane 1Gb/s 8/10b encoded)
U20-U31 Reserved for future use Bits U0-U31 indicate the technology that is supported by the node. The following priority resolution for Rx and Tx may be used for asymmetric capabilities. Each node will resolve its supported speed independently for transmit and receive directions. Priority resolution for Rx side may be as follows:
1) KR-4 Rx
2) KR Rx
3) KX-4 Rx
4) KX Rx The Rx advertised abilities are compared with a link partner Tx advertised abilities, and the highest priority technology supported by both is selected.

Priority resolution for Tx side is as follows:
1) KR-4 Tx
2) KR Tx
3) KX-4 Tx
4) KX Tx The Tx advertised abilities are compared with the link partner Rx advertised abilities, and the highest priority technology supported by both is selected. Thus, transmit and receive sides may have separate transfer rates.

As an example, for B212 (FIG. 2), compatible abilities may be KR-4 RX and KR-4 TX. This means that both sides use 4 lanes operating at 10 Gb/s using the same encoding (e.g. 8b/10b). Incompatible abilities may be KR RX and KX-4 TX. In this example, the Rx (e.g. the receive side) uses 64/66 encoding and a single lane operating at 10 Gb/s, while the transmit side uses 4 lanes operating at 10 Gb/s with 8b/10b encoding.

In one embodiment, the process of FIG. 2 enables the use of a same number of lanes on the transmit side and the receive side with different signaling rates. For example, a transmit side may use KR (10Gb/s single lane) while the receive side (or vice-versa) may use KX (1Gb/s, single lane). Another example of using different signaling rates is KX-4 (i.e. 10Gb/s, 4 lanes) and 40G KR-4 (40Gb/s, 4 lanes).

The embodiments disclosed herein are different from the Ethernet standard where a same transfer rate is applied for both the transmit side and the receive side of a port/network node. The embodiments provide flexibility where multiple lanes are used in link 112. One is able to use a single lane in one direction and multiple lanes in other directions. This will result in power savings and more optimum use of network resources. Lower switching speeds generally result in lower power dissipation as the rate of capacitive charge and discharge of circuit nodes is lower. When one direction uses a lower transfer rate than it would in a symmetric implementation this may result in the same network infrastructure supporting more channels thus resulting in more optimum use of network resources.

In one embodiment, as mentioned above, receive and transmit sides may use different (asymmetric) number of lanes for receiving and transmitting data. Network traffic pattern information is typically collected by a network administrator using a management console that executes a management application) (not shown). This traffic pattern information can be used by ASIC manufacturers' to design and manufacture network device ports that have uneven number of lanes. Thus, for example, if a receive side uses fewer lanes than the transmit side, then one can produce integrated circuit chips with fewer lanes that are used by a receiving port. Fewer lanes will result in reduced gate count, pin count, power usage and also improve packet routing.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for establishing asymmetric transfer rates between a first node and a second node communicating with each other via a network link using Ethernet as a network protocol, comprising:
determining during a negotiation process that the first node and the second node have compatible asymmetric capability to set a first rate for transmitting information via the network link and a second rate for receiving information via the network link using Ethernet as the network protocol;
establishing the first rate for transmitting information and the second rate for receiving information; and
exchanging a first set of parameters between the first node and the second node with an indicator that the first node and the second node will be sending a second set of parameters.

2. The method of claim 1, further comprising:
exchanging a second set of parameters between the first node and the second node that indicate transfer rates for transmitting information and transfer rates for receiving information at the first node and the second node.

3. The method of claim 1, wherein the network link that couples the first node and the second node includes a plurality of lanes.

4. The method of claim 1, wherein the negotiation process is part of Ethernet Auto-Negotiation.

5. The method of claim 1, wherein the first node and the second node are network adapters communicating with each other.

6. The method of claim 1, wherein the first node and the second node are network ports communicating with each other.

7. The method of claim 1, wherein the first node and the second node are network switch elements communicating with each other.

8. A machine implemented method for establishing asymmetric transfer rates between a first node and a second node communicating with each other via a network link using the Ethernet protocol, comprising:

during a negotiation process, exchanging a first set of parameters between the first node and the second node with an indicator that the first node and the second node will be sending a second set of parameters;

exchanging a second set of parameters between the first node and the second node that indicate transfer rates for transmitting information and transfer rates for receiving information at the first node and the second node;

determining during the negotiation process that the first node and the second node have compatible asymmetric capability to set a first rate for transmitting information via the network link using Ethernet as the network protocol and a second rate for receiving information via the network link; and establishing the first rate for transmitting information and the second rate for receiving information.

9. The method of claim 8, wherein the network link uses a plurality of anes for transmitting and receiving network traffic.

10. The method of claim 8, wherein the negotiation process is part of Ethernet auto-negotiation.

11. The method of claim 8, wherein the first node and the second node are network adapters communicating with each other.

12. The method of claim 8, wherein the first node and the second node are network ports communicating with each other.

13. The method of claim 8, wherein the first node and the second node are network switch elements communicating with each other.

* * * * *

UNITED STATES PATENT AND TRADEMARK OFFICE
CERTIFICATE OF CORRECTION

PATENT NO. : 8,948,203 B1  
APPLICATION NO. : 13/755770  
DATED : February 3, 2015  
INVENTOR(S) : Nolan et al.

Page 1 of 1

It is certified that error appears in the above-identified patent and that said Letters Patent is hereby corrected as shown below:

On the Title Page, Item (54) and in the Specification, column 1, line 2 (Title), delete "ASYMETRIC" and insert -- ASYMMETRIC --, therefor.

In the Specification

In column 3, line 46, delete "10B" and insert -- 106B --, therefor.

In column 6, line 59, delete "S3" and insert -- S4 --, therefor.

In column 8, line 56, delete "U5" and insert -- U25 --, therefor.

In the Claims

In column 12, line 7, in Claim 9, delete "anes" and insert -- lanes --, therefor.

Signed and Sealed this
Twenty-eighth Day of July, 2015

Michelle K. Lee
*Director of the United States Patent and Trademark Office*